United States Patent

Fujioka

[15] 3,635,666

[45] Jan. 18, 1971

[54] PROCESS FOR THE PURIFICATION OF ALKALI METAL SULFIDES

[72] Inventor: George S. Fujioka, Walnut Creek, Calif.

[73] Assignee: The Dow Chemical Company, Midland, Mich.

[22] Filed: July 1, 1970

[21] Appl. No.: 51,679

[52] U.S. Cl. .................................23/134, 23/52, 23/110 A, 23/181, 23/212 R
[51] Int. Cl. ..................................................... C01b 17/22
[58] Field of Search................23/134, 52, 110 A, 181, 212 R

[56] References Cited

FOREIGN PATENTS OR APPLICATIONS 189,805  1/1967  U.S.S.R. ..................................23/134
1,041,480  10/1958  Germany..................................23/134

*Primary Examiner*—Edward Stern
*Attorney*—Griswold & Burdick, Jerome L. Jeffers and William R. Norris

[57] ABSTRACT

Disclosed is a process for the purification of alkali metal sulfides which involves contacting the sulfide as a melt with solid aluminum, aluminum oxide, silica or mixtures thereof.

10 Claims, No Drawings

PROCESS FOR THE PURIFICATION OF ALKALI METAL SULFIDES

BACKGROUND OF THE INVENTION

Recent battery technology such as that disclosed in U.S. Pat. No. 3,476,602 involves the use of a molten alkali metal anode and molten alkali metal polysulfide catholyte which are separated by a solid alkali metal ion permeable membrane as electrolyte. In one embodiment of such a battery, the electrolyte consists of hollow fibers made of a silicate glass which are filled with the molten alkali metal and dipped in the molten alkali metal polysulfide. Such a battery is operated at an elevated temperature, e.g., approximately 300° C., to maintain the alkali metal and alkali metal sulfides in the molten states. Alkali metal hydroxides are corrosive to silicate glass at these elevated temperatures. Therefore, it is desirable to reduce the amount of alkali metal hydroxide impurity which is ordinarily present in the alkali metal sulfide melt to a low level.

It is an object of the present invention to provide a novel process for the purification of alkali metal sulfides.

It is a further object to provide such a process which will result in an alkali metal sulfide which is substantially free of alkali metal hydroxide.

An additional object is to provide such a process which incorporates the use of inexpensive, readily available materials.

SUMMARY OF THE INVENTION

The present invention involves contacting an alkali metal sulfide melt with solid aluminum, aluminum oxide, silica or mixtures thereof as a reactive agent. The process is carried out in an atmosphere which is inert to the reactants and the products. The absence of oxygen and hydrogen in the atmosphere is especially desirable. The process is carried out at a temperature within the range from the melting point of the alkali metal sulfide to its boiling point or decomposition temperature, whichever is lower, for a period of time sufficient to allow the purification reaction to occur to the desired extent. The solid reactive agent is normally separated from the melt by conventional liquid-solid separatory techniques after purification has taken place.

DETAILED DESCRIPTION OF THE INVENTION

The process is practiced by heating the alkali metal sulfide at least to its melting point under an inert atmosphere. Such inert atmosphere may conveniently be maintained by filling the reaction vessel with $N_2$ or one of the noble gases after purging it of air.

The temperature of the alkali metal sulfide melt may vary over a wide range. However, temperatures of from 20° to about 100° C. above its melting point are preferred.

Aluminum, aluminum oxide, silica or mixtures thereof are added to the melt preferably in particulate or fibrous form with care being taken not to admit noninert gas to the reaction vessel. The amount of solid material added to the melt is not critical. However, in order to insure substantially complete removal of hydroxide impurities, the amount of material added should be at a minimum of 1 weight percent of the alkali metal sulfide being treated. Quantities of the solid material ranging from 2 to 5 weight percent of the alkali metal sulfide being treated are preferred.

The particle size of the solid material is not critical and may vary over a wide range. Small particles, i.e., those having dimensions of less than 100 mesh on the U.S. standard sieve series, are preferred due to their high surface area.

The solid materials are allowed to remain in contact with the alkali metal sulfide melt for a period of time sufficient to allow purification to take place. Some purification will occur in approximately 30 seconds, however, reaction times of from 15 to 30 minutes are preferred in order to achieve effective purification. Longer reaction periods may be employed when it is desired to remove substantially all of the hydroxide impurities.

In one embodiment of the process, silica is introduced to the alkali metal sulfide melt in the form of a silica source material. A convenient source material is a silicate glass containing less than one equivalent of metal oxide per equivalent of $SiO_2$. The silica source material is preferably selected from compounds having melting points above that of the alkali metal sulfide being treated to avoid difficulties involved in separating the alkali metal polysulfide from the silica source material after treatment. The amount of silica source material used is preferably that which will provide a ratio of usable silica to alkali metal polysulfide within the range hereinbefore set out. In this embodiment, the metal oxide component of the glass preferably comprises the same metal as the alkali metal polysulfide to be purified.

Normally, the process is used to purify the sodium polysulfides since sodium metal is the preferred anode material in the aforementioned battery. The process is most commonly practiced with sodium tetrasulfide being used as the alkali metal polysulfide.

Although the invention is not premised on an explanation of its underlying theory, it is believed that the following reactions account for the removal of hydroxide impurities from alkali metal polysulfides:

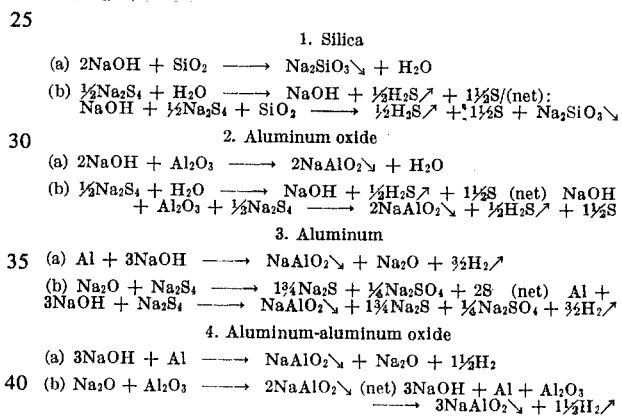

The above equations demonstrate the removal of the elements hydrogen and oxygen necessary to form the undesirable hydroxide impurities from the alkali metal polysulfide. The hydrogen leaves the reaction mass as a gas. The resulting oxygen containing compounds are insoluble in the sodium tetrasulfide and may be removed by solid-liquid phase separation techniques such as filtration or centrifuging with decantation at elevated temperatures. Excess reactive agent is also removed in this manner provided its melting point is above that of the alkali metal sulfide to be purified.

The above equations, in which sodium is the alkali metal and the sodium polysulfide is $Na_2S_4$ are merely representative. It is understood that the equations may be modified to represent the reactions which take place between the purifying agents and other alkali metal polysulfides.

The following examples will serve to further illustrate the invention:

EXAMPLE I $Na_2S \cdot 9H_2O$ was dehydrated by the method reported by N. I. Kopylor in C. A. 68, 108,432 (1968).

Flowers of sulfur was purified by the method of G. Brauer reported in Handbook of Preparative Inorganic Chemistry, Vol. 1; 2nd ed.

The anhydrous sodium sulfide ($Na_2S$), which analyzed at 1.39±0.04 percent oxygen was heated with the purified sulfur to form 22.3 grams of $Na_2S_4$. The reaction vessel was degassed under vacuum at 300°–350° C. Approximately 5 g. of glass wool was added and the vessel again degassed at 100° C. for 1½ hours. The glass wool had the following composition based on weight: $SiO_2$ (80.5%), $B_2O_3$ (12.9%), $Na_2O$ (3.8%), $K_2O$ (0.4%) and $Al_2O_3$ (2.2%). Nitrogen gas was introduced to the vessel and the temperature raised to 350° C. and held at the level for a period of 20 hours. Hydrogen sulfide (12 mg.) was detected in the gas space above the melt. While still molten, the $Na_2S_4$ was filtered through a coarse porosity, sintered glass frit. The $Na_2S_4$ filtrate was recovered in the amount of 13.2 g. Activation analysis for oxygen gave 0.06±0.002 percent oxygen. Glass chips were contacted with the sodium tetrasulfide at greater than 300° C. for a period of 4 days without any corrosion of the glass being observed.

EXAMPLE II

Sodium tetrasulfide for subsequent purification was prepared as follows:

Commercial reagent grade hydrated sodium monosulfide was dehydrated by boiling out the water with gradual heating to 300° C. The resulting solid was heated to 300°–400° C. under a blanket of nitrogen. Commercial sulfur (99.8 percent) was vaporized and passed through an 800° C. zone before being collected in a nitrogen filled receiver. The essentially anhydrous sodium sulfide was mixed with a stoichiometric amount of the sulfur to provide a ratio of sodium to sulfur of 2:4. This composition was digested at 500° C. for 16 hours and filtered to yield the $Na_2S_4$ starting material.

About 25 grams of the $Na_2S_4$ prepared by the above procedure was heated with several small immersed strips of aluminum foil for 66 hours at a temperature range of from 400° to 500° C. The total exposed aluminum surface was between 6 and 8 sq. cm. The purified $Na_2S_4$ ($\approx$20 grams) was recovered by filtration of the hot melt through a fritted glass filter.

The purified $Na_2S_4$ was tested by exposing hollow glass fibers in an imposed stressed configuration to the polysulfide at a temperature of 300° C. for 112.5 hours. The fibers, which had 100$\mu$ OD and 50$\mu$ ID, were bent into "U" shapes having a radius of 8 mm. The curved portion was immersed in the test sodium tetrasulfide under nitrogen. Attack on the glass was detected by weakening of the fiber in Instron, tensile strength measurements. Instron testing of seven replicate test fibers which had been immersed in the purified sodium tetrasulfide revealed failures occuring between 105 and 335 grams load with a median of 200 grams. Unstressed control fibers not exposed to sulfide melt failed at a median load of approximately 250 grams. Identical stressed fibers exposed to unpurified sodium tetrasulfide for 90 hours failed below 100 grams load.

EXAMPLE III

Three hundred five grams of sodium tetrasulfide, prepared as in Example II, were mixed with 3 grams of dry silica gel (28-300 mesh) and digested for 94 hours at 400° C. The melt was passed through a course fritted glass filter and 235 grams of purified $Na_2S_4$ recovered Glass surface corrosion tests similar to those of example II showed substantial improvement in the quality of the $SiO_2$ treated sodium tetrasulfide.

EXAMPLE IV

Glass particles of composition $Na_2O \cdot 2SiO_2 \cdot 1/2B_2O_3$ were placed in glass ampuls along with sodium tetrasulfide prepared as described in example II. Sample A of the $Na_2S_4$ was purified by being heated with 1 weight percent glass wool having the composition set out in example I for 20 hours at 350° C. and filtered through a glass frit. Sample B was not purified. The ampuls were sealed and heated to 300° C. At the end of the indicated time the ampuls were opened and the glass examined. The results of these experiments are presented in the following table:

| $Na_2S_4$ sample | Exposure time | Appearance of glass |
|---|---|---|
| A | 4 days | No evidence of corrosion. |
| A | 42 days | No pitting or surface cracks, some strain cracks. |
| B | 63 hours | Surface cracks and beginning of crazed surface. |

Other alkali metal sulfides which are readily purified by the process of the instant invention are $Li_2S$, $Li_2S_a$, $Na_2S$, $Na_2S_3$, $Na_2S_5$, $K_2S$, $K_2S_3$, $Rb_2S_2$, $Rb_2S_5$, $Cs_2S_2$, $Cs_2S_3$ and $Cs_2S_6$.

What is claimed is:

1. A process for removing hydroxide impurities from an alkali metal sulfide which comprises:
    a. contacting the alkali metal sulfide as a melt with solid aluminum, aluminum oxide, silica or mixtures thereof as reactive agent; and
    b. maintaining the temperature of the alkali metal sulfide within the range from its melting point to its decomposition or boiling point, whichever is lower, under an inert atmosphere for a period of time sufficient to allow reaction between the solid reagent and said hydroxide impurity content contained in the sulfide.

2. The process as defined in claim 1 which includes the additional step of removing the reactive agent from the alkali metal sulfide melt after the reaction has taken place.

3. The process as defined in claim 1 wherein the alkali metal sulfide is $Li_2S$, $Li_2S_2$, $Na_2S$, $Na_2S_3$, $Na_2S_5$, $K_2S$, $K_2S_3$, $Rb_2S_2$, $Rb_2S_5$, $Cs_2S_2$, $Cs_2S_3$ or $Cs_2S_6$.

4. The process as defined in claim 1 wherein the alkali metal sulfide is sodium tetrasulfide.

5. The process as defined in claim 1 wherein the amount of reactive agent is at least 1 weight percent of the alkali metal sulfide.

6. The process as defined in claim 1 wherein the amount of reactive agent is from 2 and 5 weight percent of the alkali metal sulfide.

7. The process as defined in claim 1 wherein the reactive agent is in particulate or fibrous form.

8. The process as defined in claim 7 wherein the particles of reactive agent have dimensions of less than 100 mesh on the U.S. standard sieve series.

9. The process as defined in claim 1 wherein the silica is in the form of a silica source material said source material being a silicate glass containing less than one equivalent of metal oxide per equivalent of $SiO_1$.

10. The process as defined in claim 9 wherein the silica source material is glass having the following composition based on weight: $SiO_2$ (80.5%), $B_2O_3$ (12.9%), $Na_2O$ (3.8%), $K_2O$ (0.4%) and $Al_2O_3$ (2.2%).

* * * * *

PO-1050
(5/69)

UNITED STATES PATENT OFFICE
CERTIFICATE OF CORRECTION

Patent No.     3,635,666     Dated     18 January 1972

Inventor(s)     George S. Fugioka

It is certified that error appears in the above-identified patent and that said Letters Patent are hereby corrected as shown below:

Please change the issue date of this patent from "January 18, 1971" to --January 18, 1972--.

Signed and sealed this 8th day of May 1973.

(SEAL)
Attest:

EDWARD M.FLETCHER,JR.
Attesting Officer

ROBERT GOTTSCHALK
Commissioner of Patents